United States Patent [19]
Baer et al.

[11] 4,355,805
[45] Oct. 26, 1982

[54] MANUALLY PROGRAMMABLE VIDEO GAMING SYSTEM

[75] Inventors: Ralph H. Baer, Manchester; Leonard D. Cope, Merrimack, both of N.H.

[73] Assignee: Sanders Associates, Inc., Nashua, N.H.

[21] Appl. No.: 838,419

[22] Filed: Sep. 30, 1977

[51] Int. Cl.[3] .............................................. A63F 9/22
[52] U.S. Cl. ................................ 273/85 G; 273/313; 273/DIG. 28; 340/709; 340/723
[58] Field of Search ................ 273/1 G, 85 G, 101.2, 273/DIG. 28, 237, 313; 35/9 C; 340/324 A, 324 AD, 709, 710, 723–725; 364/200 MS File, 900 MS File, 410

[56] References Cited

U.S. PATENT DOCUMENTS

| | | | |
|---|---|---|---|
| 3,399,401 | 8/1968 | Ellis et al. | 364/200 |
| 3,659,284 | 4/1972 | Rusch | 340/324 AD |
| 3,659,285 | 4/1972 | Baer et al. | 340/324 AD |
| 3,728,480 | 4/1973 | Baer | 273/DIG. 28 |
| 3,731,299 | 5/1973 | Bouchard et al. | 340/324 A |
| 3,742,289 | 6/1973 | Koeijmans | 315/18 |
| 3,761,877 | 9/1973 | Fernald | 35/9 C X |
| 3,778,058 | 12/1973 | Rausch | 273/85 G |
| 3,809,395 | 5/1974 | Allison et al. | 273/DIG. 28 |
| 3,846,826 | 11/1974 | Mueller | 340/710 |
| 3,891,792 | 6/1975 | Kimura | 340/726 |
| 3,921,161 | 11/1975 | Baer | 273/85 G |
| 3,980,994 | 9/1976 | Ying et al. | 364/200 |
| 4,026,555 | 5/1977 | Kirschner et al. | 273/85 G |
| 4,034,990 | 7/1977 | Baer | 273/85 G |
| 4,053,740 | 10/1977 | Rosenthal | 273/DIG. 28 |
| 4,126,851 | 11/1978 | Okor | 273/DIG. 28 |
| 4,127,849 | 11/1978 | Okor | 358/182 |
| 4,156,928 | 5/1979 | Inose | 273/237 |

OTHER PUBLICATIONS

*Popular Electronics*, "Build the Pixie Graphic Display", Jul., 1977, pp. 41–46.

*Primary Examiner*—Vance Y. Hum
*Attorney, Agent, or Firm*—Louis Etlinger; Richard I. Seligman

[57] ABSTRACT

Apparatus and methods are disclosed herein for use in conjunction with raster scan video displays, including standard monochrome and color television receivers, for the generation, display and manipulation of images upon the screen of a display for the purpose of playing games or for the purpose of drawing pictures. In addition to the generation of signals which, when supplied to the video display, cause the display of moveable and immoveable game playing indicia such as walls, players, and balls to play a variety of typical games such as tennis, handball, billiards, and the like, in a manner well known in the art, other indicia are displayed on the display screen in response to commands from the game operator which are defined by the operator as to shape, location, color and other attributes and are, furthermore, endorsed with interactive characteristics.

14 Claims, 3 Drawing Figures

MANUALLY PROGRAMMABLE VIDEO GAMING SYSTEM

BACKGROUND OF THE INVENTION

The present invention relates generally to electronic video game devices which allow video displays to be utilized as active rather than passive instruments. More specifically, the present invention relates to video display gaming devices on which can be played a variety of games or pictures may be drawn. Each game may be manually varied by the operator to achieve an infinite variety of games.

Electronic game devices which generate signals for the display of games on monitor video displays or television receiver screens are well known in the prior art and well illustrated by U.S. Pat. Nos. 3,659,284; 3,659,285; 3,728,480; 3,778,058; 3,809,395; 3,921,161 and 4,034,990 which are incorporated herein by reference. The electronic game devices represented by these patents are multiple game attachments for video displays or television receivers and have electrical circuitry for generating signals which cause the display of game playing indicia such as walls and moveable players and spots or balls.

The electronic game devices of ones of the aforementioned patents may be used to play several different "rebound" type games such as, but not limited to, baseball, tennis, handball, basketball, and billiards. Others of these patents teach devices for the playing of other games not of a "rebound" type variety such as target shooting, golf and bowling.

All the many variety of games taught or suggested in the aforementioned patents, as well as other games played with video display gaming devices known in the art, all provide a fixed format for such games. That is, such things as the basic rebound walls, player's paddles and balls are a fixed part of each particular video game. Game variables are restricted to the speed of the balls, the position of the players and similar game variations. These limitations greatly restrict the variations of games that can be played. The lack of individual game variations is one factor that causes player interest in video games to wane. This is one problem with prior art video games which the present invention solves.

Creative games have long been advocated for the proper development of children and this particularly includes games that let a child exercise or express their artistic skills. Present electronic video games are generally competitive in nature or they exercise individual skills of a single player. No prior art electronic video games permit a game operator to exercise their creative skills, rather than their individual or competitive game skills, using a video display or television receiver, by permitting "sketching" by the game operator.

SUMMARY OF THE INVENTION

In accordance with the teaching of the invention a multi-game video device may be provided along with other apparatus that is manually operable by the game players to modify individual video games into an infinite number of variations. The players select and place such things as barriers of any configuration anywhere on the playing area of a video screen. Such game variations are limited only by the imagination of the players and the game variations they create may be relatively simple or may be relatively complex. Such game modifications coupled with such standard variations as varying the speed of a moving ball and deflecting the path of a ball ("english") further increase the complexity of each game. As such, game variations are created by the players and meet their abilities, waning interest in games is minimized or eliminated.

One illustration of the infinite variety of challenging games that can be created by the players is in a pinball type of game. In this type of game one player launches a moving spot (the ball) which is rebounded from various "bumper" under symbols located on the playing field. Coincidence of the moving ball spot, with a wall, barrier or bumper drawn either by the machine or by the player results in a rebound, this obstacle having been endowed with interactive characteristics. With barriers or bumpers of many shapes as selected by the players and placed in the game playing area, such a pinball type of game takes on a complexity which will challenge any player. With the ability to add and delete barriers or bumpers of any shape it becomes more difficult for a player to master a game. In addition to challenging even the most skilled of video game players, it provides for an unlimited variety of the games.

The apparatus we provide, working in conjunction with video games to permit game variations that challenge a player may also be utilized without a game display for artistic creative purposes. A child or an adult may utilize the apparatus in accordance with the teaching of our invention to create artistic patterns or drawings on a video screen. On a black and white video display such drawings are in black, white and greys, whereas on a color video display color drawings may be created. In this mode of operation our novel game apparatus is alike a child's "Etch-a-Sketch" toy but with increased capabilities of selectively adding and deleting to a drawing.

DESCRIPTION OF THE DRAWINGS

The present invention will become more apparent from the following detailed description when considered in conjunction with the drawing wherein.

GENERAL DESCRIPTION

Figure 1:
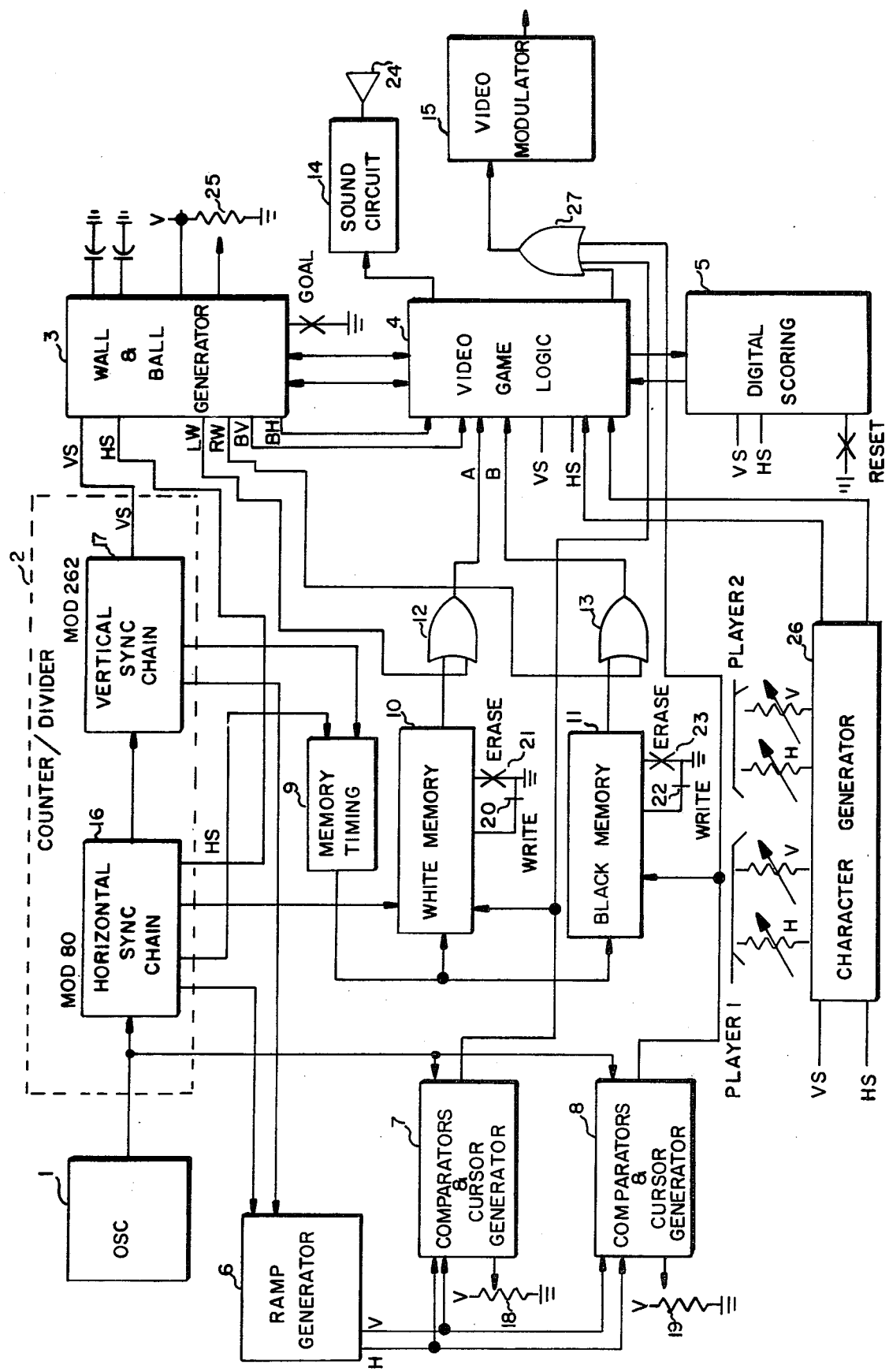
FIG. 1 is a general block diagram of our invention.

Referring now to FIG. 1, therein is shown a general block diagram of our invention. Our invention typically incorporates wall and ball generator 3, video game logic circuit 4, digital scoring circuit 5, character generator 26 and video modulator 15, each of which is a commercially available integrated circuit and are interconnected generally as shown in FIG. 1 to provide basic rebound type games. Wall and ball generator 3 is illustratively a Texas Instruments SN76427 integrated circuit, video game logic circuit 4 is illustratively a Texas Instruments SN76428 integrated circuit, digital scoring circuit 5 is illustratively a Texas Instruments SN76462 integrated circuit, character generator circuit 25 is illustratively a Texas Instruments SN76426 integrated circuit, and video modulator circuit 15 is illustratively a National Semiconductor LM1889 integrated circuit. Wall and ball generator 3 functions in a well known manner to generate digital signals representing the horizontal and vertical position of the ball and other digital signals locating the walls. Potentiometer 25 is used to locate the position of the walls. Video game logic circuit 4 responds to the signals input thereto via leads LW, RW, BV and BH to determine time coincidence of the digital signals on these leads which represents the ball intersecting a wall and then returns signals to wall and ball generator 3 causing signals representing a rebounding ball to be generated thereby in a manner well known in the art. Circuit 4 also detects scoring conditions and signals digital scoring circuit 5 which in turn generates signals for the display of the scores of the players on the video display screen also in a manner well known in the art. Circuit 4 is also used to apply wall and ball signals, characters and scoring signals to RF modulator 15, the output of which is an RF signal used to drive a video display in a well known manner. In addition, circuit 4 also provides signals to sound circuit 14 upon a ball hitting a wall or paddle which causes sound circuit 14 to output a signal to transducer 24 to produce an audible rebound signal to the game players.

The circuit elements described in the last paragraph all comprise commercially available integrated circuits which have been identified. Further connections, interconnections and operation of these integrated circuits can be found in the literature available from the manufacturers. It is believed to be within the ability of those skilled in the art to connect these chips and similar chips available from other manufacturers to produce the many well known video games. Detail concerning these standard circuits is not given so as not to detract from the invention. Here the similarity with prior art game circuits ends and we turn now to describe the circuits and their functions which distinguish our invention over the prior art.

Oscillator 1 and counter/divider 2 are also well known in the art and are available commercially in integrated circuit form. These circuits produce the horizontal synchronization, vertical synchronization and other timing signals necessary to modulate a radio frequency carrier to get a television type signal. In addition, circuit 2 provides many other timing signals required by my novel circuit. Vertical and horizontal synchronization signals output from counter/divider 2 are applied to the standard integrated circuits as well as to the circuitry now to be described which permits game players to modify games in an almost infinite variety of combinations and permits a single operator, such as a child, to sketch pictures and patterns on the video display. When enabled, our novel circuit generates a black spot or cursor and a white spot or cursor on the video display on which may or may not also be displayed a video game. Using manual controls the operator moves the spots or cursors around the video display to draw pictures or to add barriers or bumpers into a game playing field. To maintain the display of a drawing or of walls or bumpers added to a game playing field, memories 10 and 11 are provided which are used to store the signals for that which is drawn by the operator and the contents of these memories are then used to refresh the display on the video screen.

More particularly, ramp generator 6 generates two ramp signals, one at the same rate as the horizontal sweep of the video display, and the other at the same rate as the vertical sweep of the display. These ramp signals are applied to the two inputs of the comparator and cursor generators 7 and 8. Additional inputs to each of comparators 7 and 8 is from potentiometer controls 18 and 19 respectively which are manually operated by the game operator. These potentiometers 18 and 19 are joystick controls which actually each comprise two potentiometers, associated respectively with horizontal and vertical movement of each of the cursors. There is a potential V applied across each potentiometer and the setting of the potentiometer wipers selects a voltage which is applied to the second input of each of the comparators. Depending upon the setting of the potentiometers, the comparator and cursor generators 7 and 8 each provide output signals which horizontally and vertically locate the white and black cursor respectively on the face of the video display. As the potentiometers 18 and 19 are operated, the cursors move around the face of the video display. Connected to the output of the comparators in circuits 7 and 8 are cursor generators which are an internal part thereof and which are used to generate a pulse of a fixed width with leading and trailing edges of said pulse synchronized to the system clock. This output pulse width determines the size of the cursor or spot on the face of the video display.

The signals output from comparator and cursor generators 7 and 8 are applied via OR 27 gate to video modulator 15 for the immediate display of the cursor on the video display. At the same time the signals are also being input to white memory 10 and into black memory 11 as shown in FIG. 1. Before describing memories 10 and 11, I briefly describe their purpose. In the video game and drawing modes of operation the background on the video display is a grey color caused by partially unblanking the beam of the display. Drawing is accomplished by using either a white cursor on the screen which is moved about to create white lines, barriers and bumpers for a picture or game, or the picture or game may be similarly drawn or modified with black lines. Both the black and white colors may be used in the same picture or game. In the event a color video display is utilized the output from memories 10 and 11 can be used to gate color chroma circuits in order to have a color display.

White memory 10 and black memory 11 each include a shift register memory, which in this embodiment, is made up of 1,024 stages and the output of the last stage is coupled around to the input of the first stage to create a loop. Information stored in these shift register loop memories is recirculated through the loop while the equipment is in operation as will now be described. Recirculation of the stored information around the loop memory is required because memories 10 and 11 are refresh memories, the output of each of which are used to maintain the display of the barriers or bumpers on a game playing field, or to maintain a picture drawn on the video display. To properly function, the information stored in memories 10 and 11 must be circulated therein in direct correspondence with the scanning raster of the video display. Thus, there is one storage location uniquely associated with each display location on the video display.

The circulation function is controlled by a memory timing circuit 9 which derives signals from horizontal synchronization chain 16 and vertical synchronization chain 17 in counter/divider 2 and produces output signals to the individual shift registers within memories 10 and 11. These signals cause shift registers in memories 10 and 11 to circulate their stored information in direct correspondence with the scanning raster of the video display.

It can be seen that there are two manual inputs to each of memories 10 and 11 which are write switches 20 and 22 and erase switches 21 and 23. These switches are used by the operator of the equipment while drawing lines and bumpers. When none of these switches 20 to 23 are operated, that is the switch is in the non-connected middle position, comparator and cursor generators 7 and 8 output a signal used to display a cursor or spot on the face of the video display but these signals are not stored within memories 10 and 11. As joystick controls 18 and 19 are operated, the cursor or spot is moved around the face of the CRT but nothing is drawn or erased in the process. This occurs because no information is being stored in memories 10 and 11. When switch 20 is operated while joystick control 18 is operated, the spot or cursor on the video display draws lines thereon as it moves. This occurs because as the cursor is moving, the signals generated are stored within the white memory 10, the output of which is used to refresh the video display to continuously display the bars drawn by the cursor. As previously mentioned the output from memory 10 will cause white bars to be painted on the grey background of the display. In a similar manner, the operation of the joystick control 19 while write switch 22 is operated causes black bars to be displayed on the video display.

Once a white bar is traced on the display, moving the cursor over the same bar results in no change in the white display. However, if erase switch 21 is operated while the white cursor is moved over a white segment of a bar, that portion of displayed white bar over which the cursor is being moved will be erased from memory 10. Should the white cursor be positioned on a black bar or a black picture element when white erase switch 21 is closed, no erase function is performed on the black picture element. The black erase switch 23, functions upon the black memory and black display picture elements similar to the function of the white erase switch 21 just described.

It should also be noted that in the event that a black picture element is drawn (or loaded into the black refresh memory) in an identical display picture element location with a pre-existing white picture element, then a gray element is resultant on the display (which may be a different gray shade than the background gray). In the case of a color video display embodiment, for example, the superposition of two picture elements, one from each of the two separate refresh memories, results in a third new picture element color.

The output of memories 10 and 11 are connected respectively to OR gates 12 and 13 as shown. The other input to OR gates 12 and 13 are the wall signal outputs on leads LW and RW from wall and ball generator 3. Thus, wall signals generated by generator 3 are mixed with signals output from memories 10 and 11 and the composite signals are applied to video game logic circuit 4. The composite wall and barrier information signals and the ball location information signals are processed by circuit 4 in a manner well known in the art and then the video signals are applied via OR gate 27 to video modulator 15 where they are used to modulate an RF carrier of a frequency which, when input to a video display or television set, causes the desired display thereon. The audio signals output from circuit 4 are applied to sound circuit 14 and thence to transducer 24 to produce an audible rebound signal as is well known in the art.

In summary, when wall and ball generator 3 is inactivated and there are no signals being generated thereby for any video games, only the signals being output from memories 10 and 11 are passed respectively through OR gates 12 and 13, video game logic circuit 4, and OR gates to video modulator 15. In this mode of operation there is no game information being displayed and our equipment is in the creative drawing mode which is similar to the "Etch-a-Sketch" toy. In the event wall and ball generator 3 is enabled and generates signals for a selected game, while no signals are stored in memories 10 and 11, only the selected game will appear on the video display. If the drawing mode is then used by the game players who utilize joysticks 18 and 19 to create bumpers or barriers which are then stored in memories 10 and 11, these are then overlaid on the game display area to produce an almost infinite variety of the games while varying the complexity of the games to suit the abilities of the players.

DETAILED DESCRIPTION

Figure 2:
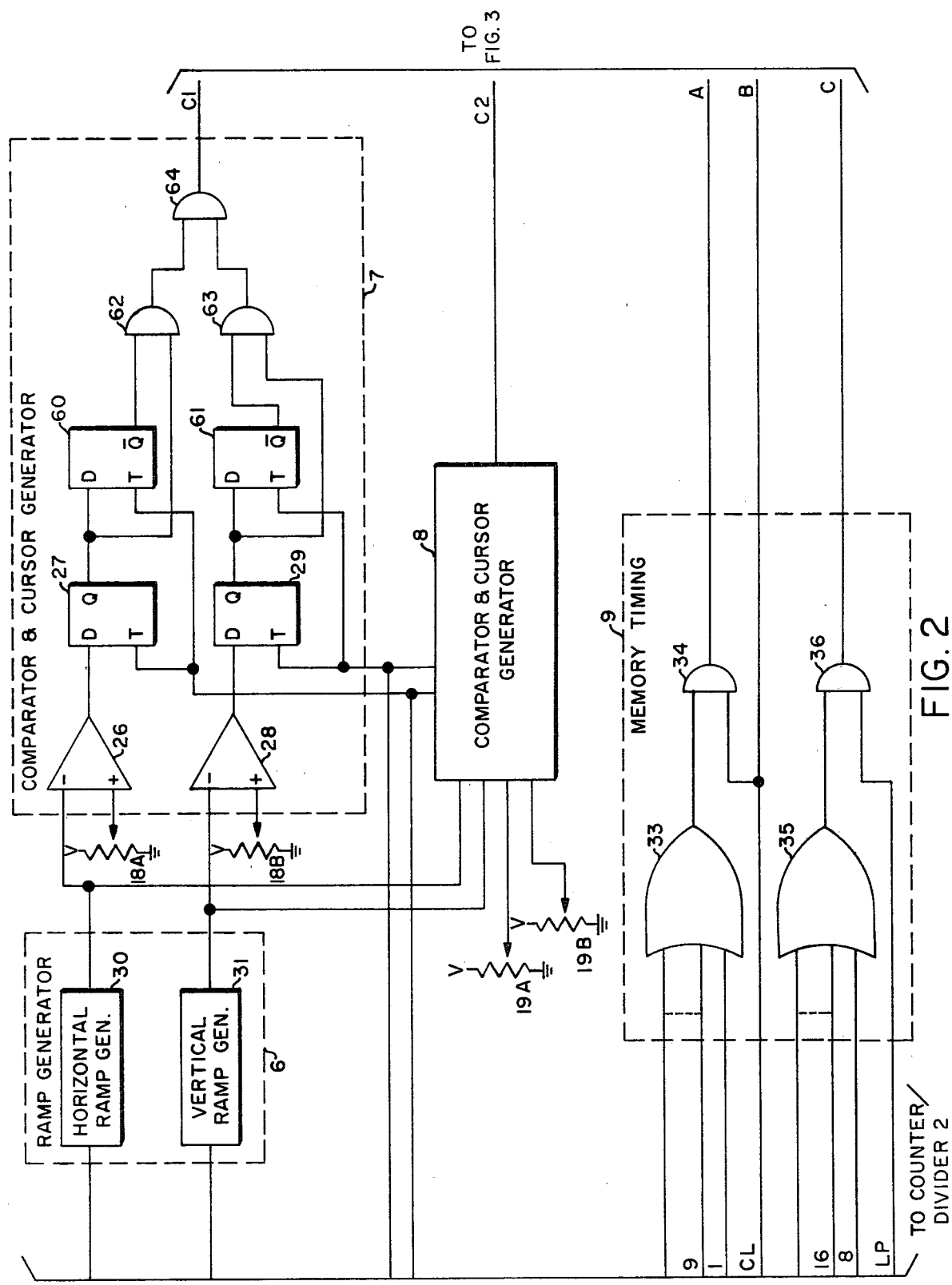
FIG. 2 is a detailed block diagram of a portion of the invention.
Figure 3:
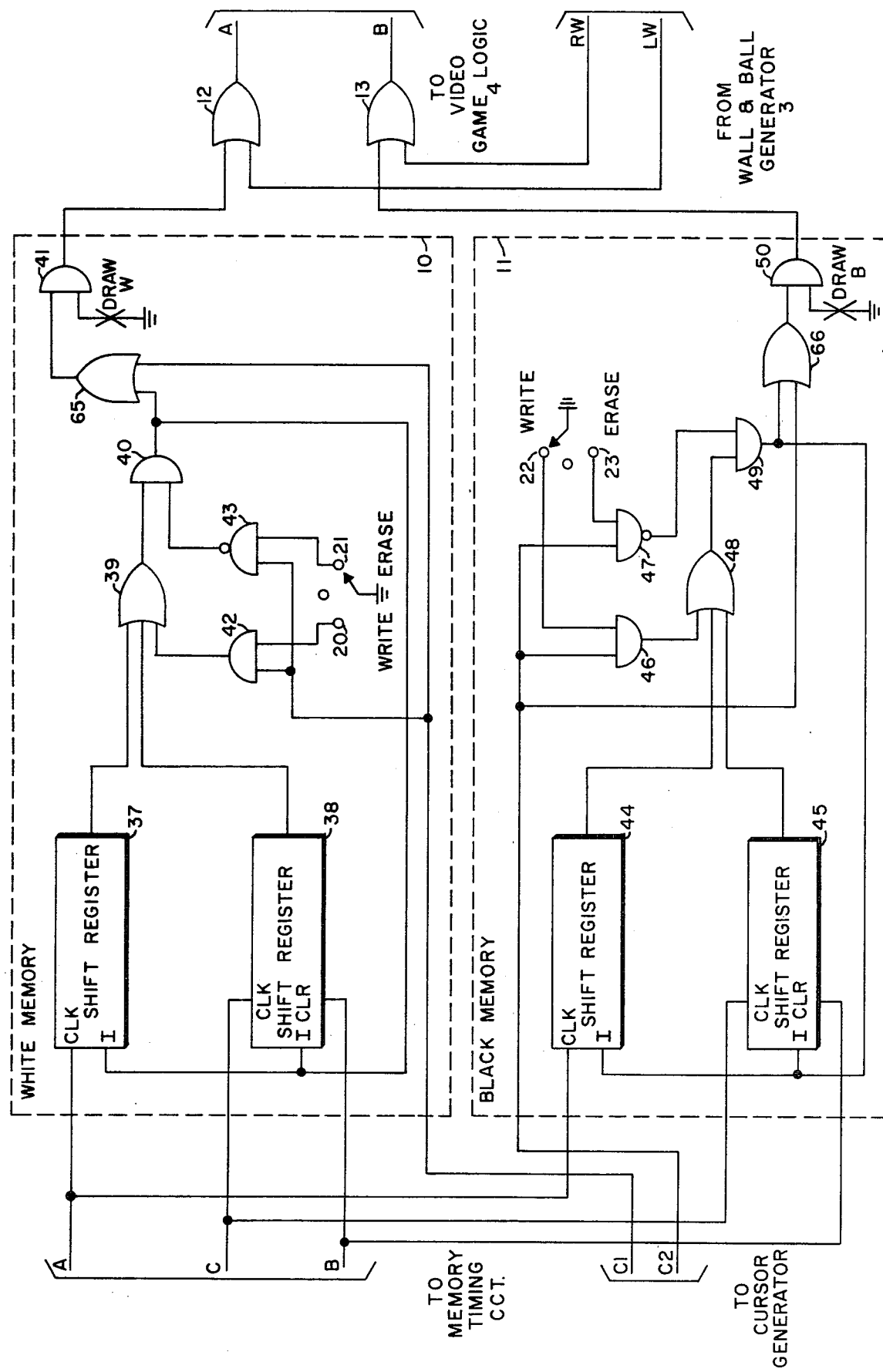
FIG. 3 is a detailed block diagram of the remainder of the invention.

Turning now to FIGS. 2 and 3 to describe in detail the inventive aspects of our invention these are seen to incorporate primarily ramp generator 6, comparator and cursor generators 7 and 8, memory timing circuit 9, white memory 10 and black memory 11, gates 12 and 13, and video game logic 4. In FIG. 2 are shown the aforementioned circuits 6 through 9 having inputs thereto from counter/divider circuit 2 which is not shown in these figures and is only shown in block diagram form in FIG. 1. As previously mentioned, counter/divider 2 is a circuit well known in the art used to divide down the output of an oscillator 1 to provide numerous timing signals used to operate video game circuits, including vertical synchronization and horizontal synchronization signals. Circuit 2 is not described in detail herein to avoid detracting from the description of the inventive aspects of our video game system.

Ramp generator 6 includes a horizontal ramp generator 30 and a vertical ramp generator 31, both of which are well known in the art and are energized by signals from counter/divider 2. Horizontal ramp generator 30 generates an output ramp signal the time duration of which corresponds to the period of time it takes the electron beam of a television type video display, to which the subject video game is connected, to traverse horizontally across the screen in a single horizontal sweep or scan. Similarly, vertical ramp generator 31 generates a ramp having a duration corresponding to the time it takes the video display electron beam to go from the top of the display to the bottom of the display as it sweeps a number of horizontal sweeps or traces to completely trace the entire video display screen.

The outputs from horizontal ramp generator 30 and vertical ramp generator 31 are applied to comparator and cursor generators 7 and 8 as is shown. Only the detail of comparator and cursor generator is shown in FIG. 2 as the circuit details of comparator and cursor generator 8 are identical. It can be seen that the outputs from ramp generators 6 and 7 are applied to comparators 26 and 28 respectively within comparator and cursor generator 7. A second input to each of comparators 26 and 28 is from the wipers of potentiometers 18A and 18B as shown. The potentiometers are connected across a power source as indicated in order to divide a potential or voltage V anywhere from ground potential to the full potential V. Potentiometers 18A and 18B are operator controls utilized in conjunction with white memory 10 in FIG. 3. Controls 18A and 18B are used to move a white cursor around the face of the television type video display to draw white bumpers or walls in a game playing field or to draw white portions of pictures drawn on the video display.

As potentiometer 18A is varied over its operational range it causes the white cursor to move horizontally across the video screen from the left edge of the screen to the right edge thereof. This is accomplished by the action of comparator 26 which compares the varied voltage input thereto from potentiometer 18A with the horizontal ramp signal also input to the comparator. Upon comparator 26 determining that its ramp voltage has exceeded the potentiometer voltage there is a high signal output therefrom to the D-input of flip-flop 27. Flip-flop 27 is a D type flip flop, well known in the art, which will store the logic state of the signal present at its D-input when its T-input is energized. The T-input of flip-flop 27, along with the T-input of flip-flop 60, is energized by an output from counter/divider 2 as is shown. The signal from counter/divider 2 to the T-input of flip-flops 27 and 60 is a chain or train of pulses at a rate used to identify each display bit in a horizontal row on the face of the television type video display. In this embodiment of my invention there are only 32 display bits along each horizontal sweep across the video display. Accordingly, there will be 32 pulses applied to the T-input of the flip-flops 27 and 60 for each horizontal sweep of the display which corresponds to each ramp signal output from horizontal ramp generator 30. Flip-flop 27 is utilized to synchronize the output of comparator 26 with each bit position on the video display and, therefore, the white cursor or spot will only appear in a discrete display bit position on the video display and can never straddle two positions. Synchronization of the cursor signals is necessary to prevent timing ambiguities which would otherwise arise when writing into the black and white refresh memories. Flip-flop 60 and associated gate 62 are used to produce a pulse which has a width equal to the period of the pulses applied to the T-input.

The Q output of flip-flop 27 is applied to the D input of flip-flop 60, the $\overline{Q}$ output of the latter of which is applied to one of the two inputs of AND gate 62. The other input to AND gate 62 is from the Q output of flip-flop 27. The pulse of the aforementioned 32 pulse chain occuring following the Q output of flip-flop 27 going high will cause the $\overline{Q}$ output flip-flop 60 to go low. There is a period equal to the clocking interval of the last mentioned pulse chain during which both inputs of AND gate 62 are high and, accordingly, there is a pulse output from AND gate 62 having a pulse duration equal to the clocking interval.

In a similar fashion, the output from vertical ramp generator 31, comparator 28, D type flip-flops 29 and 61, and AND gate 63 cooperate to provide a pulse output signal from AND gate 63 determining the vertical position of the white cursor on the video display screen. The timing signal applied to the toggle T inputs of flip-flops 29 and 61 and derived from counter/divider 2 comprises a 32 pulse chain occuring for each vertical sweep of the display. Each of the last mentioned pulses occurs as the video display electron beam scans each of the 32 rows of display elements.

At the moment in time that the video display electron beam is scanning the display element to be marked by the cursor, there is the pulse output from both AND gates 62 and 63. Accordingly, both inputs of AND gate 64 are high and there is a pulse output from this AND gate to white memory 10 defining the white cursor and directly to OR gate 27 to be applied to video modulator 15. It will be recognized that the pulse output from AND gate 64 actually comprises a series of eight pulses one for each of the eight scans making up the display element defined by the cursor position.

Thus, the operator uses potentiometer 18A to horizontally position the white cursor and uses potentiometer 18B to vertically position the white cursor on the video display screen. Potentiometers 18A and 18B may comprise two separate potentiometers but may advantageously be combined in a single joystick type control, well known in the art, which incorporate two potentiometers with only a single joystick to operate both.

Comparator and cursor generator 8, along with its potentiometers controls 19A and 19B, function in the identical manner just described for generator 7 except that its output signal on lead C2 is input to black memory 11 in FIG. 3.

Also shown in FIG. 2 is memory timing circuit 9. Included in circuit 9 are OR gates 33 and 35 each of which has a plurality of inputs from counter/divider 2. To better understand the choice of the inputs to OR gates 33 and 35 we must digress and review the general operation of white memory 10 and black memory 11 in FIG. 3. As mentioned heretofore, in this embodiment of our invention the television type video display is subdivided into 32 rows each containing 32 display bit or display element positions totally, 1,024 display bits each of which can be intensified or darkened to display respectively either a white cursor or a black cursor.

It must be kept in mind, however, as is common in the art, that a typical non-interlaced video game may be implemented with a scanning raster of 262 lines. As this embodiment of our invention only utilizes effectively 32 horizontal display rows, each of these display rows has been implemented to comprise 8 horizontal scans of the raster scanning electron beam of the video display for a total game display raster of $32 \times 8 = 256$ lines. The remaining 6 lines of the standard 262 line non-interlaced raster are timed and the outputs to black and white memories are inhibited during this interval. Thus, a white cursor or a black cursor is actually displayed on the video screen over 8 successive horizontal scans of the scanning electron beam.

With the above operation in mind we return to the description of memory timing circuit 9 which can now be better understood.

In memory timing circuit 9 logic OR gate 33 is used in conjunction with logic AND gate 34 to read out each of the 32 display bits in a horizontal display row in the video display. From the previous description it can be understood that the portion of either white memory 10 or black memory 11 storing the 32 bits for a particular display line must be read out during the first of the 8 horizontal scan lines on the video display in direct synchronization with the horizontal scan of the video display. After being read out once this information is recycled 7 more times to completely trace a single horizontal display row of 32 display bits which may be lightened or darkened to display the white cursor or the black cursor respectively. This operation is accomplished by the choice of the inputs to OR gate 33 and AND gate 34 from counter/divider 2. The inputs to OR gate 33 correspond to outputs from counter/divider 2 that indicate when the first, ninth, seventeenth, twentyfifth and subsequent lines in this sequence are being traced on the video display up to the maximum of 256 lines. Each of these inputs to OR gate 33 indicate the first scan line of the eight lines making up each row of 32 display bits that are intensified or darkened to display the memory contents. The output from OR gate 33 is one of the two inputs to AND gate 34. The second input to AND gate 34 is from counter/divider 2 and is a clocking input, CL, each pulse of which corresponds to one of the 32 display bit positions in each horizontal scan. The operation of OR gate 33 and AND gate 34 with the inputs just described from counter/divider 2 is such that the output from AND gate 34 consists of a train of 32 pulses having a total time period equal to the time it takes the scanning electron beam to horizontally sweep across the face of the video display. This train of pulses occurs only when the first of the eight scan lines of a 32 bit display row is being scanned. After this train of 32 pulses there is no output from AND gate 34 for a period equal to the time it takes the scanning electron of the video display to horizontally scan the next 7 lines. Thereafter, another input to OR gate 33 is high and the result is another train of 32 pulses being output from AND gate 34. Logic OR gate 35 and AND gate 36 function in a similar manner as that just described for logic gates 33 and 34 except that the timing input signals from counter/divider 2 are different. The inputs to OR gate 35 indicate that the last scan line of the 8 horizontal scan lines that comprise a row of 32 elemental display bits is being scanned. The output of OR gate 35 is one of the two inputs to AND gate 36. The second input to AND gate 36 indicates when the horizontal scanning electron beam of the video display has completed a horizontal trace and will undergo horizontal retrace in a manner well known in the art. The result is that there is an output from AND gate 36 only immediately after the horizontal scanning electron beam has finished scanning the eight scan lines that comprise one row of 32 display bits. It can logically be understood that memories 10 and 11 in FIG. 3 require the signals output from AND gates 34 and 36 to indicate when information should be read out of memory. The details of how these signals are used is described hereinafter.

Turning now to FIG. 3, there is shown white memory 10 and black memory 11. White memory 10 has an input on lead C1 from comparator and cursor generator 7 in FIG. 2 and black memory 11 has an input on Lead C2 from comparator and cursor generator 8. Both white memory 10 and black memory 11 also have input signals on leads A, B, and C from memory timing circuit 9 in FIG. 2 that has just been described.

White memory 10 comprises storage means of a 1,024 bit shift register 37 and a 32 bit shift register 38 along with logic gates 39, 40, 41, 42 and 43 all of which cooperate to provide the proper function of memory 10 as is now described. As previously described, the display area of the video display is broken up into 32 rows each comprising 32 display bits for a total of 1,204 bits which are selectively intensified or darkened by the operator to draw pictures or to selectively place barriers or bumpers on video game playing fields to produce the infinite variety of games mentioned earlier in the specification.

As previously described, lead A which is connected to the clocking input CLK of shift register 37 in memory 10 and shift register 44 in memory 11 has a 32 bit pulse train thereon as the first of the eight horizontal scan lines comprising each of the 32 rows of display bits is being traced. These pulses applied to clocking input CLK of shift register 37 cause the contents of 32 bit positions in shift register 37 to be shifted out and applied to logic OR gate 39 as shown. During the period that it takes the scanning electron beam to scan the subsequent seven horizontal lines comprising each row of 32 display bits, shift register 37 remains idle. The 32 bits shifted out of register 37 are used to lighten or darken the first horizontal trace portion of selected ones of the 32 display bits selected by the operator using joystick potentiometers 18A, 18B, 19A and 19B, as previously described. As the 32 bits are shifted out of shift register 37 they are also looped back around to its input I to be restored in shift register 37. At the same time the same 32 bits read out of shift register 37 are applied to input I of 32 bit shift register 38 to be stored therein under control of the clocking signal applied to input CLK of register 38. These 32 bits now stored in shift register 38 are used when the next seven horizontal traces comprising each row of 32 display bits are traced. After the 8 horizontal traces comprising each row of 32 display bits is traced the input CLR of shift register 38 is energized by the signal on lead B from memory timing circuit 9 to clear the contents stored in shift register 38. This occurs because the signal on lead B is a single pulse occurring as the scanning electron beam of the video display scans the last of the 32 display bits of the last of the 8 scan lines comprising a row of 32 display bits. Thereafter, another train of 32 bits is applied to the clocking input CLK of shift register 37 to shift out the display information for the next horizontal row of 32 display bits in direct synchronization with the scanning beam. As these bits are shifted out of shift registers 37 they are displayed and are looped back around to the input I of registers 37 and 38 to maintain the storage in register 37 and to provide for tracing the remaining seven scan lines of a row of 32 display bits respectively.

Turning now to describe the operation of logic gates 39 through 43 in white memory 10. It should be noted that the signals output from shift registers 37 and 38 are applied to two of the three inputs to OR gate 39, through which the signals are passed to AND gate 40. The output of AND gate 40 is looped around and is applied to the input I of both registers 37 and 38. When a row of 32 bits is being shifted out of shift register 37 by the pulse train of 32 bits applied to its clocking input CLK, the information is looped back to be reinput to shift register 37 to maintain storage therein and at the same time the 32 bits are written into shift register 38 to be used to display the remaining 7 horizontal trace lines that comprise a row of 32 display bits.

As the 32 bits are shifted out of shift register 37 in direct correspondence with the scanning beam scanning the first of the eight horizontal trace lines that comprise a row of 32 display bits, the output is applied via AND gates 40 and 41 and OR gate 65 in memory 10 to OR gate 12 where the signals are combined with display information output from wall and ball generator 3 as previously described. It should be noted that AND gate 41 in memory 10 is a two input gate, the second input of which is a manually operated switch DRAW W which is operated to enable the output of memory 10 for either the drawing function or for especially created walls and bumpers to be mixed into a game playing field.

Now that the operation of white memory 10 has been described with respect to the operation of the storage register means contained therein, we now describe the manner in which information generated by comparator and cursors generators 7 is stored in memories 10. As described heretofore, the white cursor generated by comparator and cursor generator 7 is output on lead C1 which is shown being input to conventional logic gates 42 and 43. It can be seen that logic gates 42 and 43 in memory 10 are all two input gates. The second input to logic gates 42 and 43 is from a manually operated switch having a WRITE position 20 and an ERASE position 21, and is utilized by the game operator to indicate whether the path the white cursor has been made to travel is to be stored in memory 10 in order to construct a picture or additional game bumper or barriers, or if the cursor is to be moved without writing, or if the cursor is to erase an existing bar, bumper or wall already stored in memory 10. It should be noted that gate 42 is an AND gate while gate 43 is a NAND gate. When the manually operable switch is in the WRITE position 20 any signals present on lead C1 are passed via AND gate 42 to be coupled through gates 39 and 40, then looped around and stored in shift registers 37 and 38. At the same time the information is being stored in shift registers 37 and 38 the signal on lead C1 is also being applied via OR gate 65 and AND gate 41 to be immediately displayed without a time delay of one completer vertical scan by the electron beam of the videodisplay. In order for the signal output from memory 10 to be coupled through AND gate 40 the second input thereto from gate 43 must be high. With the selector switch in WRITE position 20 or the neutral center position, both inputs of gate 40 cannot be high. Thus, the output must be low which is thus inverted to provide a high input to gate 40.

When the switch is in ERASE position 21, the signal present on lead C1 is inverted at the output of NAND gate 43. This inverted output is passed via OR gate 39 to the input of shift registers 37 and 38 to cancel the information stored at the appropriate bit position in these registers. The overall result is the erasure of that portion of picture, wall or bumper display in white on the video display over which the white cursor is moved while the switch is in the ERASE position 21.

Black memory 11 is identical to white memory 10 just described in detail, so memory 11 is not described herein other than by reference to the previous description.

In summary, it can be seen that by utilizing the present invention that an operator may utilize joystick potentiometer controls to move either a white cursor or a black cursor around the face of a television type video display to be displayed in selected ones of 1,204 display bits arranged in 32 rows of 32 display bits each. As the cursors are moved around the screen the display bits over which the cursors are moved may be stored in white memory 10 or black memory 11 so that these display bits will be continuously refreshed. The display is, of course, dependent upon the circuitry being enabled by the operation of switch DRAW W in memory 10 and/or switch DRAW B in memory 11. Alternatively, switches associated with memories 10 and 11 may be placed in an erase position which causes the erasure of lines, bumpers, or barriers over which the white or black cursor is moved by the operator using the joystick control.

It is further seen that using these newly-created symbols as logic signal inputs to video game logic 4, they can be caused to interact with ball generator 3 output on lines BV and BH. The resulting logical decisions made by video game logic 4 circuits result in an interaction between, say the ball symbol and one of the newly-drawn "bumper" signals; this interaction may be si ilar to the well known rebound action between a wall and a ball symbol; this user-drawn bumper signal can be selectively endowed with the properties of vertical "walls", horizontal "walls", "holes" which "swallow" the ball, "pipes" which "guide" the ball and many other forms of interaction well known in the art, but hitherto only applied to preformatted, or machine generated symbology.

We claim:

1. An interactive game system including game control circuits for generating signals representing location controllable symbols and game background for display on a raster scan type video display, wherein the improvement comprises:

first means for generating a signal to display a first cursor on said video display;

first means connected to said first generating means and manually operable to cause said first generating means to modify the time of generation of said first cursor signal for moving said first cursor on said video display;

first memory means connected to said first generating means for storing said first cursor signals as they are generated by said first cursor generating means and reading out said stored signals to refresh the display of the path on said video display over which said first cursor is moved responsive to said first cursor moving means;

means for combining said signals read out of said first memory means with signals generated by said game control circuits to produce composite game signals that vary the game available using said game control circuits alone; and first means for selectively disabling said game control circuits so that the signal read out of said first memory means are the only display signals available to be applied to a video display to draw pictures thereupon.

2. The invention in accordance with claim 1 wherein said memory means comprises first storing means for storing signals representing all symbols drawn by said first cursor under control of said first cursor moving means, and second storing means for storing signals representing cursor drawn symbols to be displayed by a plurality of lines sequentially traced by the scanning raster of said video display.

3. The invention in accordance with claim 2 further comprising memory timing means for controlling the read out of signals from said first storing means and into said second storing means to be read out and used to display first cursor drawn lines.

4. The invention in accordance with claim 3 wherein said first memory means further comprises first erasing means operable for providing an erase indication to said first storing means to delete first cursor signals stored in said first storing means for cursor drawn lines over which said first cursor is moved while said erase indication is input to said first storing means.

5. The invention in accordance with claim 2 further comprising:

second means for generating a signal to display a second cursor on said video display, second means manually operable for moving said second cursor on said video display by varying when said second generating means generates said second cursor signal, second memory means for storing said second cursor signals as said second cursor is moved about on said video display and reading out said signals stored therein to refresh the display of the path on said video display over which said second cursor is moved responsive to said second cursor moving means, and, means for combining said signals read out of said second memory means with signals generated by said game control circuits to vary the games available using said game control circuits.

6. The invention in accordance with claim 5 wherein said second memory means further comprises second erasing means operable for providing an erase indication to said second memory means to delete second cursor signals stored in said second memory for cursor drawn lines over which said second cursor is moved while said erase indication is input to said second memory means.

7. An interactive game system including game control circuits for generating signals representing location controllable symbols and game background for display on a raster scan type video display, wherein the improvement comprises:

means for displaying a first cursor on said video display that can be moved about to draw lines on said display;

means connected to said cursor displaying means and manually operable to generate a first signal for causing said cursor to be moved about said video display to draw lines thereon, which represent interactive game elements when the drawn lines interact with said location controllable symbols so as to cause a change in what is displayed; and means for combining said first signal with said symbol and game background signals to interact with said location controllable symbols to provide game characteristics.

8. The invention in accordance with claim 7 wherein said first cursor displaying means comprises:

a ramp generator, a source of reference voltage, comparator means comparing ramp signals generated by said ramp generator with a said reference voltage to determine where said first cursor should be displayed on said video display, and, a one-shot multivibrator responsive to said comparator means to generate a signal of a fixed width used to display said first cursor on said video display.

9. The invention in accordance with claim 8 wherein said first cursor moving means comprises manually operable potentiometers for dividing a source voltage to derive said reference voltage input to said comparator means, said first cursor moving around on said video display as said reference voltage is varied by operating said potentiometers.

10. The invention in accordance with claim 9 further comprising means connected to said cursor displaying means to selectively disable the drawing of lines on said video display as said cursor is moved about using said manually operable cursor moving means.

11. A method for allowing game background indicia generated by game control circuits for display on a raster scan type video display to be player modified and interact with location controllable symbols also generated by said game control circuits comprising the steps of:

generating signals that cause a cursor to be displayed on said video display; and moving said cursor about said video display to draw lines thereon in response to a manual input by said player, said lines representing interactive game elements, said drawn lines interacting with said location controllable symbols so as to cause a change in what is displayed.

12. A method for allowing game background indicia generated by game control circuits for display on a raster scan type video display to be player modified and interact with location controllable symbols also generated by said game control circuits comprising the steps of:

generating signals that cause a cursor to be displayed on said video display;

moving said cursor about said video display in response to a manual input; and selectively storing cursor signals used to refresh the display of lines traced by said cursor as it is moved about said video display, said traced lines representing interactive game elements when the lines interact with said location controllable symbols so as to cause change in what is displayed.

13. A video game for generating signals in response to a manual input and used to draw on a raster scan type video display comprising:

first means for generating a signal to display a first cursor on said video display;

first manually operable means for controlling said first generating means to move said first cursor about on said video display;

a first memory for storing said first cursor signals from said first generating means as said first cursor is moved about on said display;

means for reading out said first cursor signals stored in said first memory and using them to refresh the display of the path on said video display over which said first cursor has been moved;

second means for generating a signal to display a second cursor on said video display;

second manually operable means for controlling said second generating means to move said second cursor about on said video display;

a second memory for storing said second cursor signals from said second generating means as said second cursor is moved about on said display;

means for reading out said second cursor signals stored in said second memory and using them to refresh the display of the path on said video display over which said second cursor has been moved;

first means selectively operable to erase portions of lines drawn using said first cursor upon said first cursor being moved back over said first cursor drawn line portions under the control of said first controlling means; and second means selectively operable to erase portions of lines drawn using said second cursor upon said second cursor being moved back over said line portions under the control of said second controlling means.

14. The video game in accordance with claim 13 further comprising:

first means selectively operable to disable the refresh display of first cursor drawn lines in response to signals stored in said first memory, and second means selectively operable to disable the refresh display of second cursor drawn lines in response to signals stored in said second memory.

* * * * *